United States Patent Office 3,637,906
Patented Jan. 25, 1972

3,637,906
ORIENTED THERMOPLASTIC FILMS AND
METHOD OF PRODUCING SAME
Rene Le Parathoën, Saint-Maurice-de-Beynost, France,
assignor to La Cellophane, S.A., Paris, France
No Drawing. Filed Feb. 9, 1968, Ser. No. 704,266
Claims priority, application France, Feb. 17, 1967,
95,359
Int. Cl. D01f 1/02; C08g 41/04
U.S. Cl. 260—857 L     4 Claims

ABSTRACT OF THE DISCLOSURE

Oriented thermoplastic films are produced by stretching a film of a thermoplastic polymer to which has been added at least one other thermoplastic polymer having a different crystalline melting point. An oriented thermoplastic film having an opalescent effect is achieved.

---

The present invention relates to oriented thermoplastic films and to a method of obtaining such films exhibiting an opalescent effect; and more particularly, to such a method wherein a thermoplastic film comprising two polymers of different crystalline melting points is stretched at a sufficiently high rate to obtain the desired opalescent effect.

Many thermoplastic polymers have been employed in the preparation of shaped articles, notably films, the characteristics of which are improved by stretching in order to render them more suitable for certain applications.

This stretching is generally effected either in one direction or in two directions, generally perpendicular to one another, at a temperature below the melting point of the crystalline form of the polymer with stretching ratios and stretching rates which determine the physical properties of the product obtained.

Such stretched or double-stretched films are used principally for wrapping. They are also employed, however, in millinery, for which purpose they are cut into fine strips which are either directly woven or so twisted as to form particularly strong filaments. The films that are obtained generally have a transparent and shiny appearance, which is often desirable, but which it is sometimes desirable to lessen or to modify in order to obtain novel effects.

It is known, for this purpose, to incorporate certain substances in these films in order to color them, to dull them or to metallise them. Such treatments, however, necessitate special precautions if they are to have a durable effect, and, in all cases, are disadvantageous since such treatments are lengthy and costly.

In accordance with the present invention, it has surprisingly been found that it is possible to obtain an opalescent effect which affords particularly interesting advantages in the millinery field and in the packaging field, by stretching thermoplastic films either along one axis or along two axes, at a sufficiently high rate, such thermoplastic films being modified by the addition of at least one other thermoplastic polymer having a different crystalline melting point, but capable of being worked in a trace press at a similar temperature. The additive thermoplastic polymer is added in such proportions that the mixture is suitable for use in the process of production employed and in such manner that the dynamometric characteristics of the film are not thereby impaired.

Accordingly, it is a principal object of the present invention to provide an oriented thermoplastic film and method of producing the same which eliminate the disadvantages of the prior art.

A further object is to provide oriented thermoplastic films characterized by possessing an opalescent effect and a method of producing such films wherein at least one other thermoplastic polymer having a different crystalline melting point is added and the mixture stretched at a sufficiently high rate of speed so as to produce the desired effect.

Still further objects and advantages will become more apparent from the following more detailed description of the present invention.

Accordingly, the present invention comprises a method of obtaining opalescent effects in the preparation of oriented thermoplastic films (including sheets) by extrusion of thermoplastic film-forming material and stretching of the extruded film longitudinally at a suitable elevated temperature, wherein the thermoplastic material comprises at least two polymers of different crystalline melting points and the stretching is carried out at a sufficiently high rate to obtain the desired effect.

Such a process has the advantage that it does not necessitate any lengthy and costly after-treatment. On the other hand, it is compatible with the addition of adjuvants suitable for improving certain characteristics of the finished film, and of pigments or dyestuffs for coloring it, which is particularly desirable when such films are employed in the millinery field.

In accordance with the present invention, the base thermoplastic polymer and additive polymer can comprise any conventional film forming thermoplastic material as long as the additive polymer crystalline melting point is different from that of the base polymer to which it is added. Generally, the additive thermoplastic polymer is added in an amount of from about 0.1% to about 20% by weight of the base thermoplastic polymer.

Thus, the exemplary thermoplastic film-forming polymers which can be advantageously employed in accordance with the present invention include: polyolefins, e.g., polyethylene, polypropylene, copolymer of ethylene and propylene, etc. polystyrene, polyamides, e.g., polycaprolactam (nylon 6), polyhexamethylene adipamide (nylon 66), polyhexamethylene sebacamide (nylon 610), polyamides derived from aminoundedanoic acid (nylon 11), polyamides derived from aminododecanoic acid (nylon 12), etc. polyesters, e.g., polyethylene terephthalates, etc.

Thus, any and all of these film-forming thermoplastic polymers can be used with any other, e.g. as the base or additional polymer, as long as the crystalline melting point of the polymers are different.

A particularly attractive opalescent effect with pearly tinges can be obtained by using as the starting material a mixture of a propylene polymer and a polyamide, containing from 0.1% to 20%, and preferably from 1.2% to 5%, of polyamide, which is extruded in the form of films, longitudinally stretched at a rate (measured as hereinafter defined) which must not be lower than 50,000% per minute and which is preferably above 200,000% per minute. Optionally, the film is also stretched in the transverse direction, and thereafter optionally heat-set. Accordingly, this constitutes a preferred embodiment of the present invention.

For example, a very satisfactory result is obtained by using as starting materials, i.e. propylene polymers of the kind which are usually employed in the preparation of films, notably homopolymers having a major isotactic content and specific gravity of about 0.90 to 0.92 (which are commercially obtainable) or copolymers of propylene and of another olefin, e.g. ethylene. The polyamide added thereto can be of the type usually employed for the preparation of shaped articles, for example, polycaprolactam (nylon 6), polyhexamethylene adipamide (nylon 66), polyhexamethylene sebacamide (nylon 610) or resins derived from amino undecanoic acid (nylon 11) or from aminododecanoic acid (nylon 12). Inter-polyamides can also be used, for example, copolycondensates derived from hexamethylene diamine, adipic acid and caprolactam, or hexamethylene diamine, adipic acid and sebacic acid, or the like.

The resins can be satisfactorily mixed in the preferred proportions without requiring any particular precautions or the presence of fillers. Thus, they may be mixed at ambient temperature in conventional mixers, for example, of the rotating drum type, starting with resins in the form of granules. Additionally, the additive polymer, e.g. nylon (polyamide), may be in the form of ground waste. Preferably, previously heat-treated resins are employed in order to avoid absorption of water.

The mixture of polymers e.g., polypropylene and polyamide, thus prepared may be extruded at about 240° C. in a conventional trace press or treated in a roll-type mixer or in a continuously operating mixing and kneading machine, and thereafter collected in the form of granules. The temperature of extrusion, of course, varies depending on the polymer mixture employed.

It is also possible first to prepare a master mixture which comprises a higher proportion of polyamide or similar additive polymer. After extrusion in the trace press, this mixture may then be taken up to form granules which are thereafter mixed with polypropylene granules or other base polymer granules so as to obtain the required proportion of additive polymer in the finished product. A more homogeneous mixture is thus obtained and the dynamometric properties of the finished product are improved.

The preparation of a master mixture is recommended when the proportion of added polymer e.g., polyamide in the finished product exceeds 5%, in order to eliminate from the finished product air inclusions or blisters which are more difficult to avoid at higher addition proportions. Moreover, a smoother surface is thereby obtained.

For example, good results may be obtained when the mixture of polyamide and polypropylene contains 0.1% to 20% of polyamide, the most satisfactory results being obtained with a proportion of polyamide of 1.2% to 5%. As the proportion of polyamide is decreased below 1.2%, an increasing irregularity of the opalescent effect is observed.

The mixture can be extruded to form a sheet or film under conditions similar to those under which the main component is normally extruded, but modified as necessary to take account of the presence, in small proportions, of the additional resin. For example, a mixture consisting of 97.6% of polypropylene and 2.4% of polyamide will be extruded at temperatures between 200° and 235° C., while for pure polypropylene the temperature range would extend from 190° to 225° C. This slight increase in the extrusion temperature takes account of the fact that the melting point of the polyamides is higher than that of polypropylene and it permits the obtaining of a more homogeneous mixture. It is also found that the extrusion pressure may be slightly lowered owing to the fact that the viscosity of the polyamide is slightly lower than that of polypropylene.

The extruded mixture is treated in the usual way. For example, it can be received on a cooled drum, against which it is pressed by suitable means.

The desired opalescent effect is obtained only at the instant of the rapid stretching of the sheet at elevated temperature, and it is not dependent on the use of special stretching methods. Thus, for example, the film may be stretched under the influence of radiant heat from heating panels, or on heated rolls. The effect is obtained at the usual stretching temperatures for the main component and regardless of the stretching ratio, provided that the stretching rate is sufficiently high.

The stretching rate referred to herein is defined by the following formula:

$$\frac{\text{Low speed} + \text{high speed}}{2} \times 100 \times \frac{R-1}{D}$$

The low speed and the high speed, expressed in meters per minute, represent the speeds at which the film travels immediately before and immediately after the stretching, R being the stretching ratio and D the stretching distance expressed in meters.

If a sheet is stretched between two series of rolls around which it is wound as on a capstan in order to avoid any slip, the first group consisting of rolls heated to the stretching temperature and rotating at the low speed, and the second group consisting of rolls rotating at the high speed and cooled below the stretching temperature, the stretching distance D is the tangential distance travelled by the sheet between the point at which it leaves the last slow roll and that at which it comes into contact with the first fast roll. The stretching ratio R is the ratio of the speeds of the fast and slow rolls.

The opalescent effect will be obtained as soon as the stretching rate exceeds 50,000%/minute. Under normal industrial manufacturing conditions, which include speeds of travel which cannot be excessively reduced, stretching rates of more than 200,000% per minute are preferably chosen.

If the film is cooled by passing it through a liquid bath immediately after it is stretched and before it reaches the first fast roll, the stretching distance is the distance between the point at which the sheet tangentially leaves the last slow roll and that at which it enters the liquid.

If the stretching is carried out under heat-radiating panels disposed slightly upstream of the first fast roll, the stretching distance is the distance between the point at which the film is heated by the radiating panels and that at which it comes tangentially into contact with the first fast roll.

In all these cases, which are referred to by way of example, the stretching rate according to the invention must be higher than 50,000% per minute and is preferably higher than 200,000% per minute.

If in defining the stretching rate the stretching distance were defined as the length between the ultimate point at which the sheet has not yet begun to be reduced in cross-sectional area and that at which such reduction is complete, the calculated stretching rates would reach considerably higher values, of the order of 1,000,000%/minute or more. However, in this case the stretching distance could not be determined with a high degree of accuracy, and therefore this method of computation is not employed.

It is found that a high stretching rate may be obtained by choosing a high stretching ratio and stretching the sheet over a very short distance, which may be done without difficulty with the aid of the stretching apparatus in common use.

Independently of the longitudinal stretch effect under the above-defined conditions, the film may be transversely stretched, first or subsequently, by known methods and under known conditions so as to give it the desired dynamometric characteristics. The opalescent effect is not thereby lost.

This opalescent effect may be varied without departing from the scope of the invention by introducing into the mixture any appropriate coloring product which is fast to light and to ultra-violet rays, stable under heat and compatible with the other components of the mixture, the mixing being preferably carried out in the preparation hereinbefore referred to as the master mixture.

The present invention will now be exemplified by the following specific examples. It is to be understood, however, that such examples are presented for purposes of illustration only, and the present invention is in no way to be deemed as limited thereto.

Unless otherwise indicated, all percentages are by weight.

EXAMPLE I

A mixture was prepared consisting of 90% of isotactic polypropylene homopolymer having a fluidity index of 0.6

(at 190° C. and under a pressure of 2160 grams) and a specific viscosity in Decalin of 0.42 (measured in 0.2% solution and at 130° C.), and of 10% of polyhexamethylene sebacamide (nylon 610). This master mixture was extruded at about 240° C. in a conventional trace press with open degassing, whereafter it was incorporated in virgin polypropylene of the same nature as above in a proportion of 4 kg. of master mixture to 12.5 kg. of polypropylene, so as to obtain a final mixture comprising 2.42% of the polyamide.

The latter mixture was then extruded on a conventional trace press with closed degassing, provided with a metal-gauze filter and a flat die of a width of 250 mm. The extrusion was carried out at a rate of 2.50 m. per minute; the output of the extruder is 30 kg./hour, and the pressure before filtration 110 bars/m.$^2$.

The temperature in the trace press was between 210° and 230° C., the extrusion temperature at the die being 250° C.

The extruded film was received on a casting drum of 600 mm. in diameter at a temperature of 70° C., rotating at a peripheral velocity of 2.50 m. per minute. It was thereafter longitudinally stretched on heated rolls. The last slow roll, heated at a temperature of 152° C., rotated at the same peripheral velocity as the drum, i.e. 2.50 m. per minute. The stretching ratio was 6:1, the first fast roll rotating at a peripheral velocity of 15 m. per minute. Its temperature was 70° C.

The stretching distance, i.e. the tangential distance travelled by the film between the two rolls, was 7 mm.

The stretching rate, calculated in accordance with the above formula, was therefore 625,000% per minute.

The longitudinally stretched film was transversely stretched on a stretcher of the stenter type, having clips of conventional form, at a temperature of 175° C., and thereafter heat-set at 185° C., and finally wound onto a winder having a width of 1500 mm.

By this method, a double-stretched film was obtained having a thickness of 22 microns, and having an opalescent appearance with a pearly effect.

The same experiment carried out under the same conditions by extruding an identical polypropylene resin, containing no polyamide, gave a double-stretched film which was completely transparent and which exhibited no opalescent effect.

EXAMPLE II

Under the same conditions as described in Example I, a final mixture was prepared consisting of 96.4% of isotactic polypropylene homopolymer and 3.6% of a copolyamide obtained by polycondensation of 45% by weight of hexamethylene diamine adipate and 55% by weight of hexamethylene diamine sebacate, having a melting point of 195–200° C., a density of 1.10, and an intrinsic viscosity of 1.4.

When treated under the same conditions as in Example I, this mixture also gave a double-stretched film having a very attractive opalescent effect.

EXAMPLE III

Films are prepared as in Example I modifying the temperature slightly in the extrusion of the following composition:

90% polypropylene—10% polyethylene terephthalate
92% polyethylene terephthalate—8% nylon 66

In all cases, oriented films having an opalescent effect are prepared.

While the present invention has been described primarily with respect to the foregoing specific examples, it should be understood that the present invention is in no way to be as limited thereto, but should be construed as broadly as all or any equivalents thereof.

What is claimed is:

1. An oriented opalescent thermoplastic film consisting essentially of a polypropylene film containing 0.1% to 20% by weight of a polyamide having a crystalline melting point different from said polypropylene film, said oriented opalescent thermoplastic film being obtained by stretching said polypropylene film along one or two axes at a rate of at least 50,000% per minute.

2. A method of producing an oriented opalescent thermoplastic film which comprises stretching along one or two axes a polypropylene film modified by the addition of 0.1% to 20% by weight of a polyamide having a crystalline melting point different from said polypropylene, said stretching being affected at a rate of at least 50,000% per minute.

3. The method of claim 2 wherein said stretching is affected at a rate of at least 200,000% per minute.

4. The method of claim 1 wherein said polyamide comprises 1.2% to 5% by weight of the oriented opalescent thermoplastic film.

References Cited

UNITED STATES PATENTS

| 2,352,725 | 7/1944 | Markwood | 264—108 UX |
| 2,948,927 | 8/1960 | Rasmussen | 264—FIB. DIG. |
| 2,948,583 | 8/1960 | Adams et al. | 264—210 F |
| 3,057,825 | 10/1962 | Tassler | 264—108 UX |
| 3,154,461 | 10/1964 | Johnson | 161—178 X |
| 3,234,313 | 2/1966 | Miller et al. | 264—230 |
| 3,367,926 | 2/1968 | Voeks | 260—93.5 |
| 3,407,253 | 10/1968 | Yoshimura et al. | 264—288 X |
| 3,426,754 | 2/1969 | Biernbaum et al. | 128—156 |

FOREIGN PATENTS

| 930,962 | 7/1963 | Great Britain | 264—289 |
| 1,110,623 | 4/1968 | Great Britain | 264—289 |
| 661,083 | 4/1963 | Canada | 264—289 |
| 1,446,292 | 12/1966 | France | 264—289 |

JAY H. WOOD, Primary Examiner

U.S. Cl. X.R.

161—1, 402; 264—211, 288, 289